(12) United States Patent
Manolakos et al.

(10) Patent No.: US 12,041,012 B2
(45) Date of Patent: Jul. 16, 2024

(54) SWITCHING CONFIGURATION FOR SIMULTANEOUS INTRA AND INTER-BAND SRS TRANSMISSIONS

(71) Applicant: QUALCOMM Incorporated, San Diego, CA (US)

(72) Inventors: Alexandros Manolakos, Escondido, CA (US); Alberto Rico Alvarino, San Diego, CA (US); Pranay Sudeep Rungta, San Diego, CA (US); Enoch Shiao-Kuang Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/305,500

(22) Filed: Jul. 8, 2021

(65) Prior Publication Data

US 2022/0060307 A1 Feb. 24, 2022

Related U.S. Application Data

(60) Provisional application No. 63/067,072, filed on Aug. 18, 2020, provisional application No. 63/067,313, filed on Aug. 18, 2020.

(51) Int. Cl.
*H04L 5/00* (2006.01)
(52) U.S. Cl.
CPC ............ *H04L 5/0092* (2013.01); *H04L 5/001* (2013.01); *H04L 5/0051* (2013.01)

(58) Field of Classification Search
CPC ..... H04L 5/0092; H04L 5/001; H04L 5/0051; H04L 27/0006; H04L 5/0048; H04L 5/0094
See application file for complete search history.

(56) References Cited

U.S. PATENT DOCUMENTS

2019/0253925 A1   8/2019   Gholmieh et al.

OTHER PUBLICATIONS

3GPP TS 38.214 version 16.2.0 Release 16 (Jul. 2020); 5G; NR; Physical layer procedures for data (Year: 2020).*

(Continued)

*Primary Examiner* — Justin T Van Roie
(74) *Attorney, Agent, or Firm* — Arent Fox, LLP

(57) ABSTRACT

Aspects in a wireless network are disclosed. A user equipment (UE) may report, to a base station, a capability of the UE to simultaneously transmit sounding reference signal (SRS) resources between component carriers (CCs) in carrier aggregation (CA) across at least one frequency band using a specified arrangement of antenna ports and antennas. The UE may receive, from the base station, a configuration to simultaneously transmit the SRS resources using antenna switching for the CCs across the at least one frequency band and the specified arrangement of antenna ports and antennas. The UE may transmit the SRS resources simultaneously between at least two of the plurality of CCs in the at least one frequency band using the received configuration. Among other benefits, this dynamic allocation of resources enables the UE to perform at a level commensurate with its intrinsic capabilities, increasing network efficiency and speed.

14 Claims, 9 Drawing Sheets

(56) References Cited

OTHER PUBLICATIONS

Sony: Summary of SRS; 3GPP Draft; R1-1811880 Summary of SRS V04, 3rd Generation Partnership Project (3GPP), Mobile Competence Centre, 650, Route Des Lucioles, F-06921 Sophia-Antipolis Cedex, France; vol. RAN WG1, No. Chengdu, China; Oct. 8, 2018-Oct. 12, 2018 Oct. 12, 2018 (Oct. 12, 2018). XP051519203, Retrieved from the Internet: URL:http://www.3gpp.org/ftp/tsg%5Fran/WG1%5FRL1/TSGR1%5F94b/Docs/R1%2D1811880%2Ezip [retrieved on Oct. 12, 2018].
Moderator (Ericsson): "Output of email discussion [100b-e-NR-Pos-03] on UL SRS for positioning and UL RTOA reference time". 3GPP Draft; R1-2002970, 3rd Generation Partnership Project (3GPP), Mobile Competence Centre; 650, Route Des Lucioles; F-06921 Sophia-Antipolis Cedex; France; vol. RAN WG1, No. e-Meeting; Apr. 20, 2020-Apr. 30, 2020 May 11, 2020 (May 11, 2020), XP05188295, Retrieved from the Internet: URL:https://ftp.3gpp.org/tsg ran/WG1 RL1/TSGR1_100b_e/Docs/RI-2002970.zip R1-2002970 output of-email discussion 100b-e-NR-Pos-03_final.docx [retrieved on May 11, 2020] Sect. 2.1: Qualcomm, Vivo and LG comments; p. 3, Sect. 2.2, Huawei/HiSilicon comment; p. 5, Sect. 4.1: Sony, Vivo and Qualcomm comments, p. 19.
Moderator (NTT Docomo et al): Summary on [102-e-NR-UEFeatures-Positioning-01], 3GPP Draft; RI-2007017, 3rd Generation Partnership Project (3GPP), Mobile Competence Centre; 650, Route Des Lucioles; F-06921 Sophia-Antipolis Cedex; France; vol. RAN WG1, No. e-Meeting; Aug. 17, 2020-Aug. 28, 2020 Aug. 21, 2020 (Aug. 21, 2020), XP051921158, Retrieved from the Internet: URL:https://ftp.3gpp.org/tsg ran/WG1_RL1/TSGR1_102-e/Docs/R1-2007017.zip R1-2007017_Summary on [102-e-NR-UEFeatures-Positioning-01]_final.docx [retrieved on Aug. 21, 2020] Sect. 4.1: HuaweiHiSilicon comment; p. 9; Sect. 5, Agreement; p. 11; Sect. 11: NR Positioning p. 28.
Moderator (ZTE): Summary of [105-e-NR-7.ICRs-12] Issue#26 SRS carrier switching, 3GPP Draft; R1-2106100, 3rd Generation Partnership Project (3GPP), Mobile Competence Centre; 650, Route Des Lucioles ; F-06921 Sophia-Antipolis Cedex; France; vol. RAN WG1, No. e-Meeting; May 10, 2021-May 27, 2021 May 27, 2021 (May 27, 2021), XP052015716, Retrieved from the Internet: URL:https://ftp.3gpp.org/tsg ran/WGI RL1//TSGR1_105-e/Docs/R1-2106100.zip R1-2106100_Summary of [105-e-NR-7.1CRs-12] Issue#26 SRS carrier switching.docx [retrieved on May 27, 2021] Samsung, Apple3, Intel and Qualconm comments; p. 8-p. 9.
LG Electronics: Text proposals on Reference Signals, 3GPP Draft; RI-1808488, 3rd Generation Partnership Project (3GPP), Mobile Competence Centre; 650, Route Des Lucioles; F-06921 Sophia-Antipolis Cedex; France; vol. RAN WG1, No. Gothenburg. Sweden; Aug. 20, 2018-Aug. 24, 2018 Aug. 11, 2018 (Aug. 11, 2018), XP051515866, Retrieved from the Internet: URL:http://www.3gpp.org/ftp/tsg%5Fran/WG1%5FRL1/TSGR1%5F94/Docs/R1%2D1808488%2Ezip [retrieved on Aug. 11, 2018] Sect. 5; p. 4.
Qualcomm Incorporated: Enhancements on SRS flexibility, switching, coverage and capacity, 3GPP Draft; RI-2006795, 3rd Generation Partnership Project (3GPP), Mobile Competence Centre; 650, Route Des Lucioles ; F-06921 Sophia-Antipolis Cedex; France; vol. RAN WG1, No. e-Meeting; Aug. 17, 2020-Aug. 28, 2020 Aug. 8, 2020 (Aug. 8, 2020), XP051918245, Retrieved from the Internet: URL:https://ftp.3gpp.org/tsg ran/WG1_RL1/TSGR1_102-e/Docs/RI-2006795.zlp R1-2006795 Enhancements on SRS flexibility, coverage and capacity.docx [retrieved on Aug. 8, 2020].
International Search Report and Written Opinion from corresponding PCT Application No. PCT/US2021/041136.
LG Electronics: "Remaining Details of UL Reference Signals for NR Positioning", 3GPP Draft; R1-2004135, 3GPP TSG RAN WG1 #101-e, 3rd Generation Partnership Project (3GPP), Mobile Competence Centre, 650, Route Des Lucioles, F-06921 Sophia-Antipolis Cedex, France, vol. RAN WG1 No. e-Meeting, May 25, 2020-Jun. 5, 2020, May 16, 2020 (May 16, 2020), XP051885893, 4 Pages, Sect. 1; p. 1.

\* cited by examiner

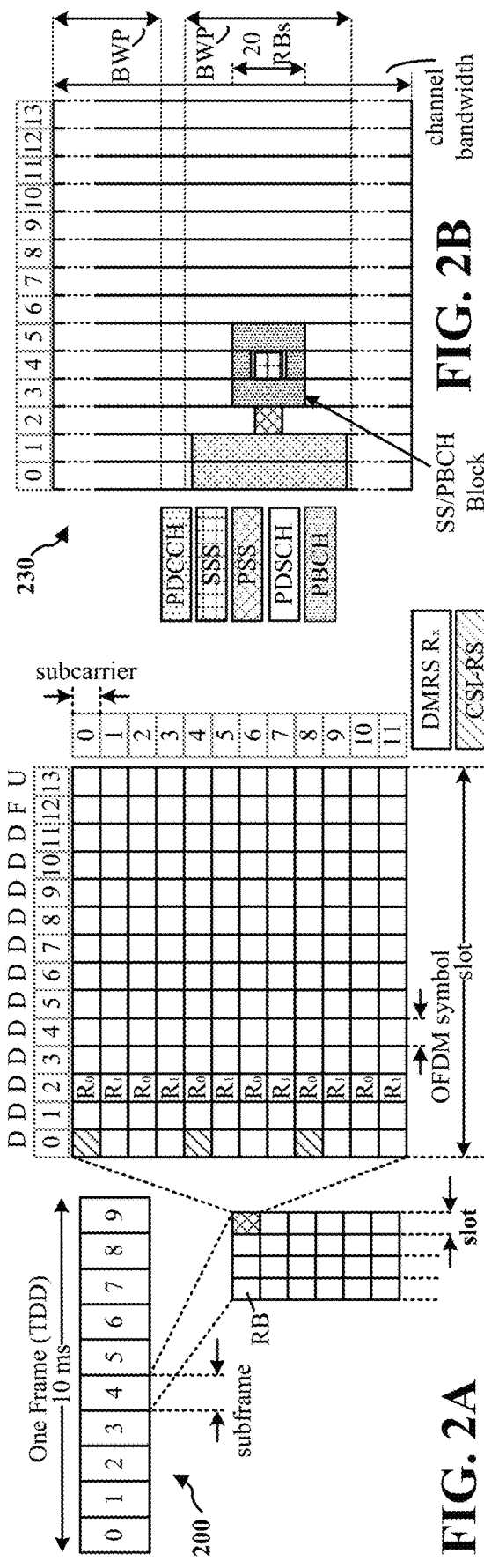
FIG. 2A
FIG. 2B
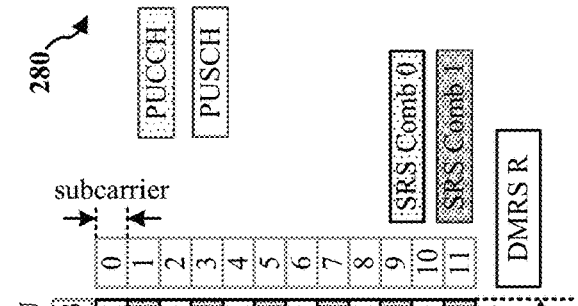
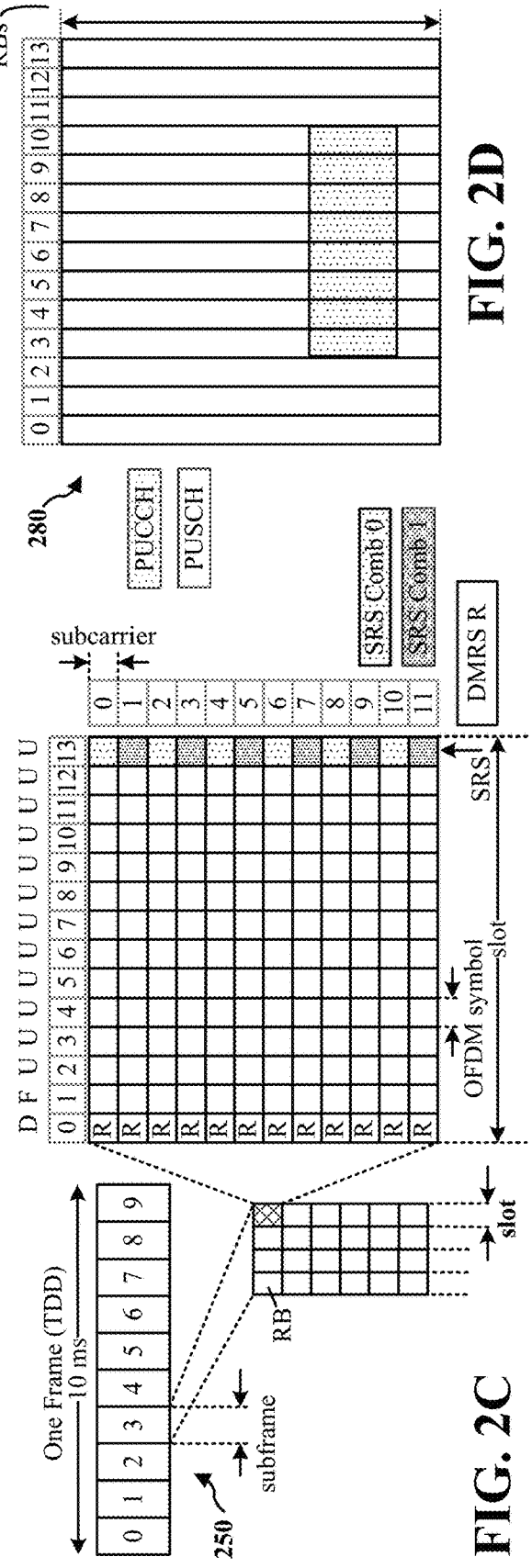
FIG. 2C
FIG. 2D

US 12,041,012 B2

SWITCHING CONFIGURATION FOR SIMULTANEOUS INTRA AND INTER-BAND SRS TRANSMISSIONS

CROSS-REFERENCE TO RELATED APPLICATIONS

This application claims the benefit of, and right of priority to, U.S. Provisional Patent Application No. 63/067,072 filed Aug. 18, 2020 and entitled "SWITCHING CONFIGURATION FOR SIMULTANEOUS INTRA AND INTER-BAND SRS TRANSMISSIONS", and Provisional Patent Application No. 63/067,313 filed Aug. 18, 2020 and entitled "SWITCHING CONFIGURATION FOR SIMULTANEOUS INTRA AND INTER-BAND SRS TRANSMISSIONS", the contents of which are expressly incorporated by referenced as if fully set forth herein.

BACKGROUND

Technical Field

The present disclosure relates generally to communication systems, and more particularly, to a sounding reference signals in a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method and an apparatus are provided. The apparatus may include a user equipment (UE). The UE includes a memory, and at least one processor coupled to the memory. The at least one processor may be configured to report, to a base station, a capability of the UE to simultaneously transmit sounding reference signal (SRS) resources between component carriers (CCs) across at least one frequency band using a switching arrangement in which the UE transmits SRS resources on one or more antenna ports over at least one antenna. The at least one processor may receive, from the base station, a configuration for the UE to simultaneously transmit the SRS resources using the same antenna ports for all of the CCs across the at least one frequency band. The UE may transmit the SRS resources simultaneously between two or more of the CCs based on the received configuration.

In a further aspect of the disclosure, another method and apparatus are provided. The apparatus may include a base station. The base station may include a memory, and at least one processor coupled to the memory. The at least one processor may be configured to receive, from a user equipment (UE), information including a capability of the UE to simultaneously transmit sounding reference signal (SRS) resources between component carriers (CCs) across at least one frequency band using a switching arrangement in which the UE transmits SRS resources on one or more antenna ports over at least one antenna. The at least one processor may further be configured to generate a configuration for the UE to simultaneously transmit the SRS resources using the same antenna ports for all of the CCs across the at least one frequency band. The at least one processor may transmit the configuration to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DESCRIPTION

Figure 1:
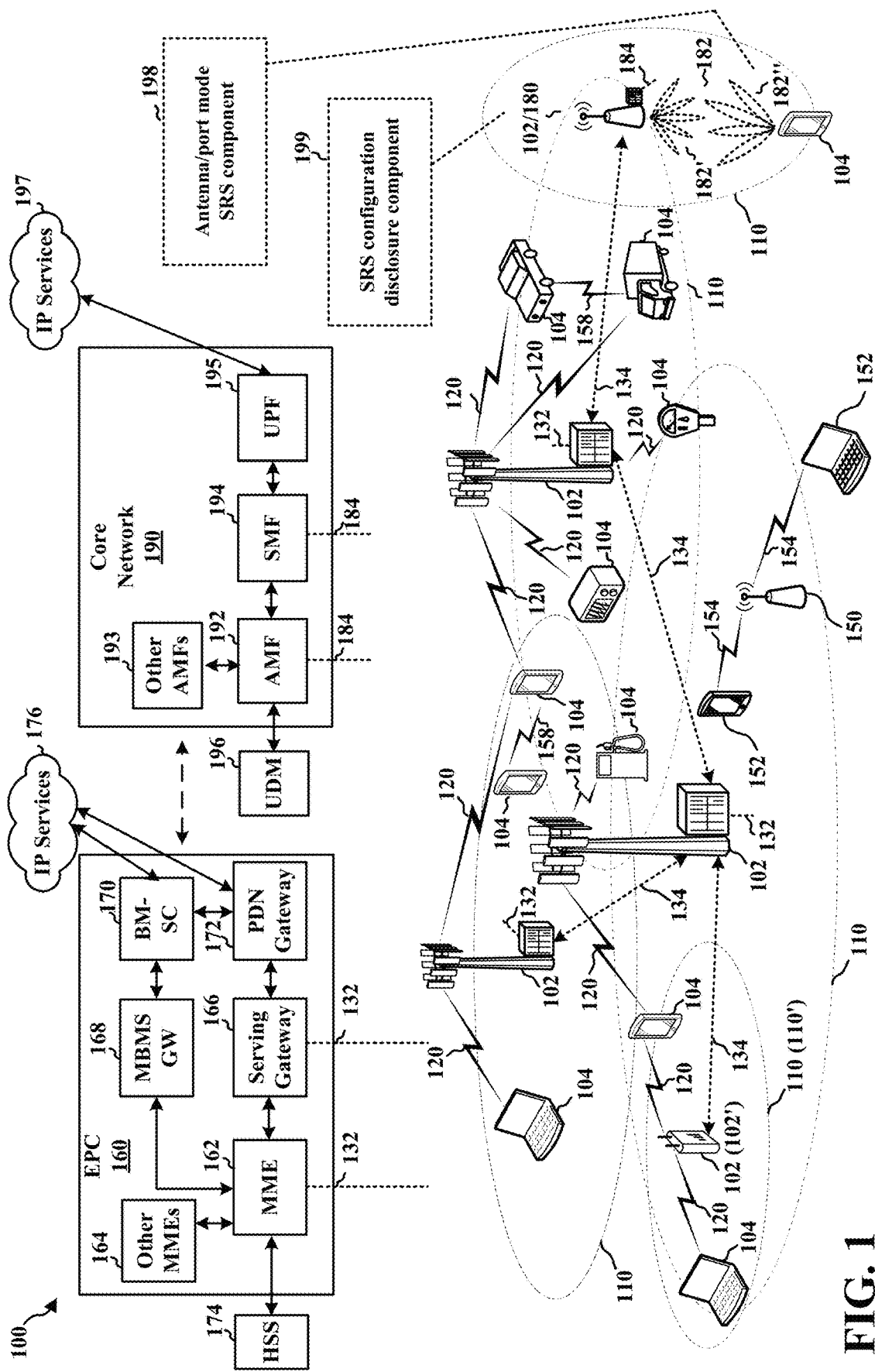
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure generally relates to configurations for sounding reference signal (SRS) switching configurations for simultaneous intra-band and inter-band SRS transmissions. Sounding reference signals are uplink physical signals employed by user equipment (UE) for use by the network in uplink channel sounding, including channel quality estimation and synchronization. SRS resources may be transmitted at specified intervals or on demand by the user equipment (UE). Because the SRS is a reference signal sent by the UE that contains information about channel quality, the network may use the SRS to make channel and timing estimations (e.g., for channel state information or CSI) for uplink scheduling of UE data transmissions, for example. SRS can also be used for assistance with codebook-based spatial multiplexing, downlink precoding in MIMO setups, control uplink transmit timing, and other tasks.

In modern networking systems, uplink SRS resources can be transmitted in a variety of ways that depend on factors including the physical configuration of the UE, whether the frequency bands in question are occupied, which component carriers are available or occupied, and other factors. As the capability of modern networking systems continues to rise, using increasing bandwidths and more feature-rich network equipment, these SRS resources can potentially be transmitted using a variety of configurations. For example, modern UEs capable of transmitting at high frequencies associated with NR often have multiple antennas that may be driven from more than one antenna port. In some cases, the antennas has one transmit "chain" including a power amplifier and filtering necessary to condition the signal for transmission on one or more of the antennas.

Currently, however, the network has no way of knowing which configuration the UE may elect to use to send SRS resources to the base station. This problem may be more apparent in carrier aggregation (CA) schemes where a UE may have the capability to switch between more than one component carrier (CC) among one frequency band (e.g., using intra-band antenna switching) or among different ones of a plurality of frequency bands (e.g., using inter-band antenna switching). Because the network may not be familiar with the capabilities of the UE, the UE may be forced to send resources in a manner that does not exploit all of its antenna configurations. Thus, the UE may not be able to use its advanced beam-switching techniques to transmit SRS resources. In some exemplary network configurations, the UE may simply have to send transmissions like SRS using default methods, without antenna switching or other advantages that may be built into the UE. Performance degradation of the UE can occur as a result.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The functions for performing the SRS configuration by the base station may be performed by, among other components, the SRS configuration disclosure component 199 of base station 102/180 in FIG. 1. The functions for receiving and implementing the configuration of intra-band and inter-band carrier aggregation may be performed by, for example, the antenna/port mode SRS component 198 of FIG. 1. Antenna/port mode SRS component 198 of UE 104 may in some implementations be used to report to the base station the capability of the UE for inter-band or intra-band antenna-switching of SRS resources. For example, component 198 may be used by the UE to report to the base station the UE's capability to switch simultaneously between different component carriers of the same frequency band (for intra-band communications) or between different frequency bands (for inter-band communications). Component 198 may include in this reporting an arrangement of antenna ports and antennas, if more than one, with which the UE is configured. In other configurations, component 198 may also include in this report the identity of the component carriers that the UE can use to send SRS resources.

SRS configuration disclosure component 199 may be used by the base station 102/180 to generate the appropriate UE SRS antenna-switching configuration based on the reported information from the UE using component 198. In addition, component 199 may be used to provide information used to report the configuration to the UE 104. In some aspects, the base station using component 199 may configure the UE to simultaneously transmit SRS resources for antenna-switching on the different CCs based directly on the capability information reported by the UE, subject to the availability of the CC's identified by component 198. A significant benefit of these aspects of the disclosure is that the base station can provide a UE with the ability to make maximum use of its available configuration of antennas. Rather than a conventional "least common denominator" approach in which all UEs transmit SRS resources according to a common minimal configuration (e.g., without antenna switching or with other restrictions), a technique can be implemented in which UEs can use most or all of their available port and antenna capabilities to maximize performance when transmitting SRS resources across one or more frequencies. This configuration can be tailored to the specific UE based on its reported capability.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
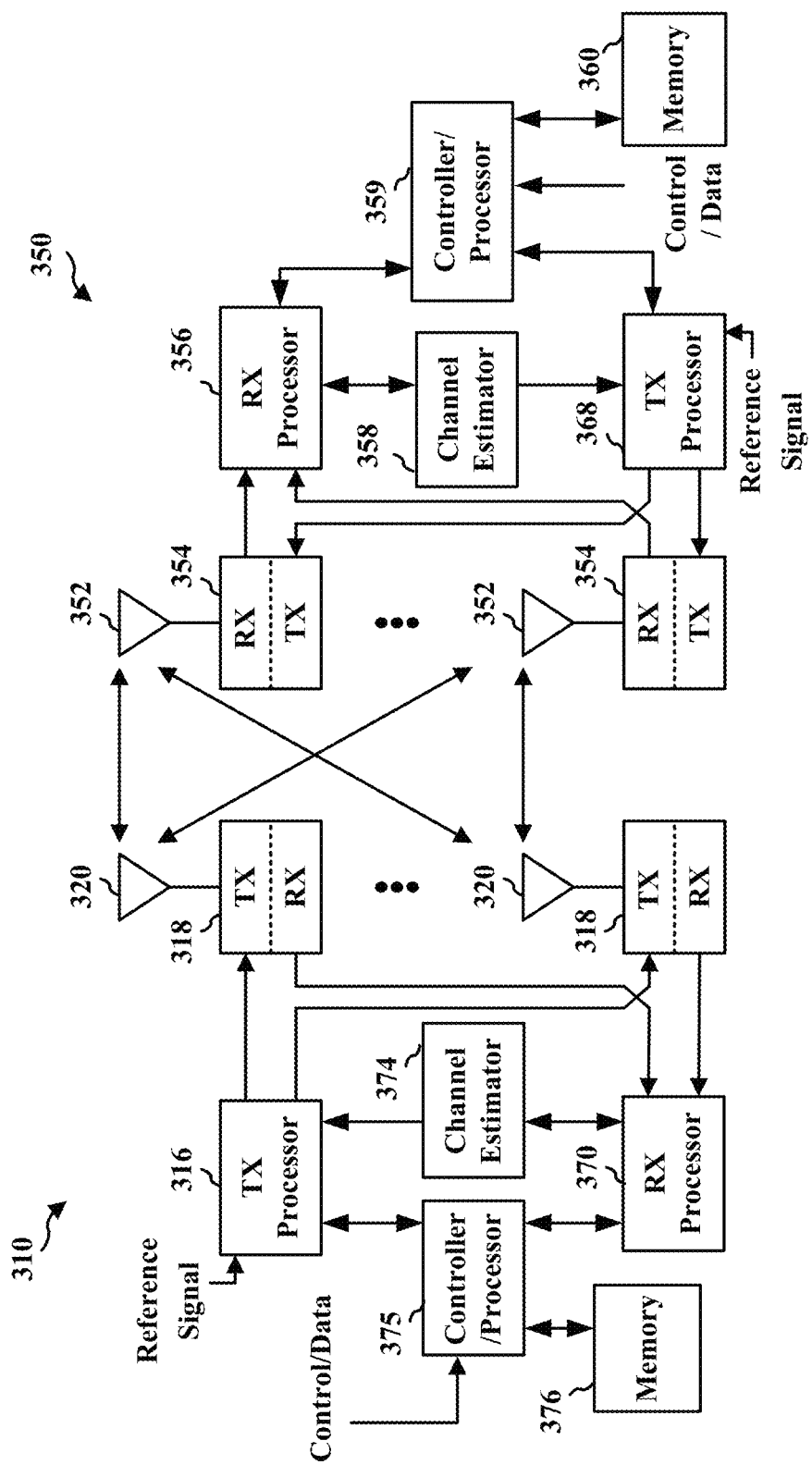
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

The present disclosure is directed generally to the allocation of UE antenna and port resources, and the intra-band and inter-band variations of SRS transmissions across specified portions of the uplink frequency band. As such, this disclosure includes aspects relevant to the circumstances under which inter-band carrier aggregation (CA) or intra-band carrier aggregation (CA) can be performed. Using the principles in this disclosure, SRS resources can be simultaneously transmitted during various antenna switching modes. In one aspect of the disclosure, the same SRS switching configuration can be used for simultaneous intra-band and inter-band SRS transmissions. More specifically, according to certain aspects of the disclosure, intra-band and inter-band antenna switching for SRS may be configured according to the capability of the UE.

Among other benefits, the principles described herein help assure that the UE is operating in CA using its maximum, or near maximum capacity as designed. This helps assure that the UE can perform sophisticated functions such as simultaneous beam switching among CCs of a different frequency band (or different CCs in the same band). The principles further assure that the network is apprised of the UE's capabilities and the UE's antenna configuration. Thus the network can configure the UE to operate using simultaneous transmissions at a high performance level. The UE, in turn, can benefit from the more sophisticated antenna configuration. By contrast, other UEs with smaller antenna configurations or overall less transmission capability can report this information to the network. The network can, in turn, assign these UEs with tasks that are commensurate with their existing features. The result is a network that capitalizes on the more advanced antenna configurations of state-of-the-art UEs while still accommodating configurations for other UEs using any type of configuration.

Figure 4:
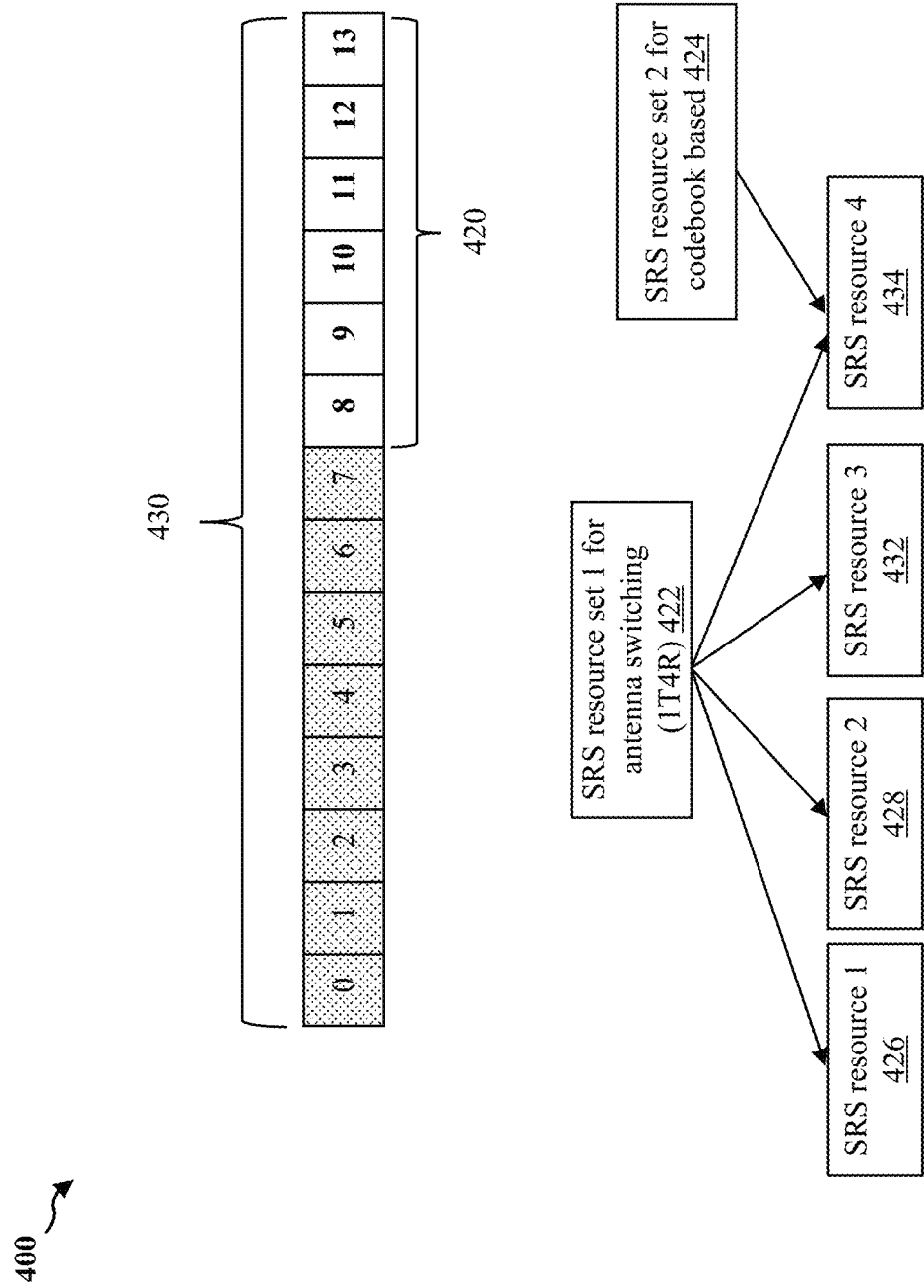
FIG. 4 is a diagram illustrating antenna switching using sounding resource signals.

FIG. 4 is a diagram illustrating antenna switching using sounding resource signals. Exemplary slot 430 includes eight initial symbols followed by six symbols 420, although any number of slot formats may also be possible. Current proposals for NR, for example, support SRS resources that can span 1, 2, or 4 adjacent symbols, with up to four ports per SRS resource. In the example shown, an SRS resource can be transmitted in the last six symbols of a slot 430. In the example of NR, an SRS is generally transmitted after the physical uplink shared channel (PUSCH) in slot 430.

An SRS resource set may include a set of SRS resources transmitted by a UE. In one configuration, an SRS resource set may be transmitted in one of three modes: aperiodic (e.g., signaled with downlink control information), periodic, or semi-persistent. The resources allocated to a UE may vary. In one example, a UE may be configured with multiple resources. These resources, in turn, may be grouped into a SRS resource set. The nature and identity of these resources may depend on a variety of factors. Some exemplary such factors may include whether antenna switching is used, whether the network configuration is codebook-based or non-codebook based, and which beam management techniques are being used. SRS transmissions may be wideband or narrowband. For example, in one configuration, an SRS bandwidth is a multiple of four physical resource blocks. Other formats may also be possible.

Referring still to FIG. 4 as shown in 422, an example resource set 1 may be configured for antenna switching, and may include a 1T4R configuration. The indicated UE antenna switching configuration described as "xTyR" corresponds to a UE that is capable of performing an SRS transmission using "x" antenna ports over a total of "y" antennas, where "y" corresponds to all or a subset of UE receive antennas. In the example of block 430, the UE has a single antenna port and four antennas, meaning that at least for purposes of antenna switching, the UE can use up to four antennas with a single antenna port. Other UEs having a wide variety of configurations may be possible. For example, the antenna configuration "2T4R" is defined to include y=4 antennas and since x=2, 2T4R corresponds to two pairs of antennas.

Example SRS resource set 422 includes four SRS resources 426, 428, 432 and 434. Another example resource set 424 is shown, which may correspond, for example, to a codebook based resource set.

Certain aspects of NR are directed to examples of SRS resources. One information element, SRS-TxSwitch, defines whether a UE supports SRS for purposes of downlink channel state information (CSI) acquisition. To this end, in a network, a UE may send a transmission identifying the capabilities of that UE, so that the network can provide the UE with the necessary configuration information. This capability signaling depends on the network and the implementation. In one configuration, capability signaling may include different parameters.

As a further example, the information element txSwitchImpactToRx may indicate the entry number of the first-listed frequency and with allocated uplink bandwidth in the relevant frequency band combination that affects the current downlink. txSwitchWithAnotherBand may indicate the entry number of the first-listed band with uplink bandwidth in the band combination that switches with the designated or present uplink transmission. For txSwitchImpactToRx and txSwitchWithAnotherBand, value 1 means first entry, value 2 means second entry and so on. All downlink and uplink combinations that switch together may indicate the same entry number. Thus, more generally, these elements may refer to two component carriers (CCs) that can be switched simultaneously. In one configuration, the UE may report its signaling capability to the base station. As another example, the UE may be restricted in some cases from including fallback band combinations for the purpose of indicating different SRS antenna switching capabilities.

In other examples, the information elements srs-TxSwitch and srs-TxSwitch-v1610 may define whether UE supports SRS for downlink CSI acquisition as defined in Release 15. In this example, the capability signaling that the UE may report to the base station can include various parameters, below.

One such exemplary information element is supportedSRS-TXPortSwitch, which can be used to identify to the network the SRS Tx port switching pattern supported by the UE (e.g., 'xTyR' as described above for SRS antenna switching). This capability information may be mandated by the network to ensure that the network can properly configure the UE. As another example, supportedSRS-TxPortSwitch-v1610, which is optional to report, may indicate downgrading configuration of an SRS Tx port switching pattern. If the UE indicates the support of downgrading configuration of SRS Tx port switching pattern using supportedSRS-TxPortSwitch-v1610, the UE may report the downgraded values, e.g., based on what is reported in supportedSRS-TxPortSwitch.

The entry number may include the band entry number in a band combination. As noted above, the UE may be restricted to not include fall-back band combinations for the purpose of indicating different SRS antenna switching capabilities.

In some configurations, the first-listed band with uplink capability may include a band associated with FeatureSetUplinkId set to 0 corresponding to the support of SRS-SwitchingTimeNR.

In various configurations, a network may include the capability to configure a number of different SRS transmit-port switching patterns that may be supported by the UE. The indicated UE antenna switching capability is identified, as above, using the 'xTyR' vernacular with x=1 and y=R, such as in the below table identifying the different network capabilities to configure UEs for SRS transmit port switching over the network for the elements supportedSRS-TX-PortSwitch and supportedSRS-TxPortSwitch-v1610, respectively:

| supportedSRS-TxPortSwitch | supportedSRS-TxPortSwitch-v1610 |
|---|---|
| t1r2 | t1r1-t1r2 |
| t1r4 | t1r1-t1r2-t1r4 |
| t2r4 | t1r1-t1r2-t2r2-t2r4 |
| t2r2 | t1r1-t2r2 |
| t4r4 | t1r1-t2r2-t4r4 |
| t1r4-t2r4 | t1r1-t1r2-t2r2-t1r4-t2r4 |

In an exemplary aspect of the disclosure, the UE may report its capabilities for transmitting using antenna switching over more than one CC in a single frequency band in CA. This technique may be referred to herein as intra-band carrier aggregation. In one aspect of the disclosure, for intra-band carrier aggregation, the same "tTrR" or "xTyR" configuration is configured by the network for all of the component carriers (CCs) in the same frequency band. As a non-exhaustive example of this proposed configuration, in one implementation, a UE is expected to be configured with the same xTyR configuration for SRS resources for antenna switching simultaneously transmitted in different CCs of the same band. Thus, in this configuration, the number of antennas is expected to be the same, and separately, the number of antenna ports is expected be the same for all of these intra-band transmissions. As an example, the UE may initially transmit a report to the base station identifying the beam-switching capability of the UE. The base station may respond by configuring the UE such that the UE can transmit SRS resources simultaneously using antenna-switching between CCs in the configuration provided by the UE.

In another aspect of the disclosure, the network may specify the same "xTyR" configuration (x=number of antenna ports) for SRS resources to be configured in all CCs of that frequency band when the UE is simultaneously transmitting SRS signals in different CCs of that band. Accordingly, in one implementation, a UE can expect to be configured with the same number of antenna ports and antennas in the SRS resources for antenna switching simultaneously transmitted in different CCs of the same band.

Additionally or alternatively, inter-band SRS communications may be transmitted when the UE intends to transmit SRS resources in different CCs across more than one frequency band. In one aspect, the same configuration may be used for both simultaneous antenna switching and antenna switching SRS in intra-band communications and inter-band communications. Thus, for example, in simultaneous antenna switching and antenna switching SRS in either intra-band carrier aggregation or inter-band carrier aggregation, the latter with two or more bands whose uplink CCs are switched together according to a capability reported to the network, the UE can expect the same xTyR configuration across the different CCs, and the SRS resources overlapped in the time domain from the UE's perspective can be from the same UE antenna ports.

For example, in one configuration, the UE may proceed to report its switching capability to the serving base station. Upon receiving the information describing this capability, the base station may configure the UE with the same "xTyR" configuration for all the CCs in the different frequency bands for which the UE has reported are being switched together using the SRS resources. For example, the same number of antennas and common ports may be used, but only in the bands that the UE has reported are concurrently used for transmission of SRS resources by the UE. By contrast, for those bands that are not concurrently used for transmission of SRS resources by the UE, the number and arrangement of antennas and antenna ports can be different.

Various configurations described herein are disclosed for providing a network configuration that allocates antenna and port resources in the context of intra-band and inter-band carrier aggregation for transmitting sounding reference signals (SRSs). In still another aspect of the disclosure directed to inter-band transmissions of SRS signals by the UE, the UE may be configured with the identical port and antenna numbers for all CCs in the bands in which the UE has reported to the network that the bands are switched together (concurrently).

In another aspect of the disclosure for inter-band transmissions, the same configuration for both ports and antennas may apply to all component carriers in all bands for inter-band transmission regardless of which time the component carriers are transmitted except that for inter-band communications for those CCs in which the UE has not reported are switched together—that is to say, simultaneously transmitted from the perspective of the UE—the number and arrangement of antenna ports may be different.

Figure 5:
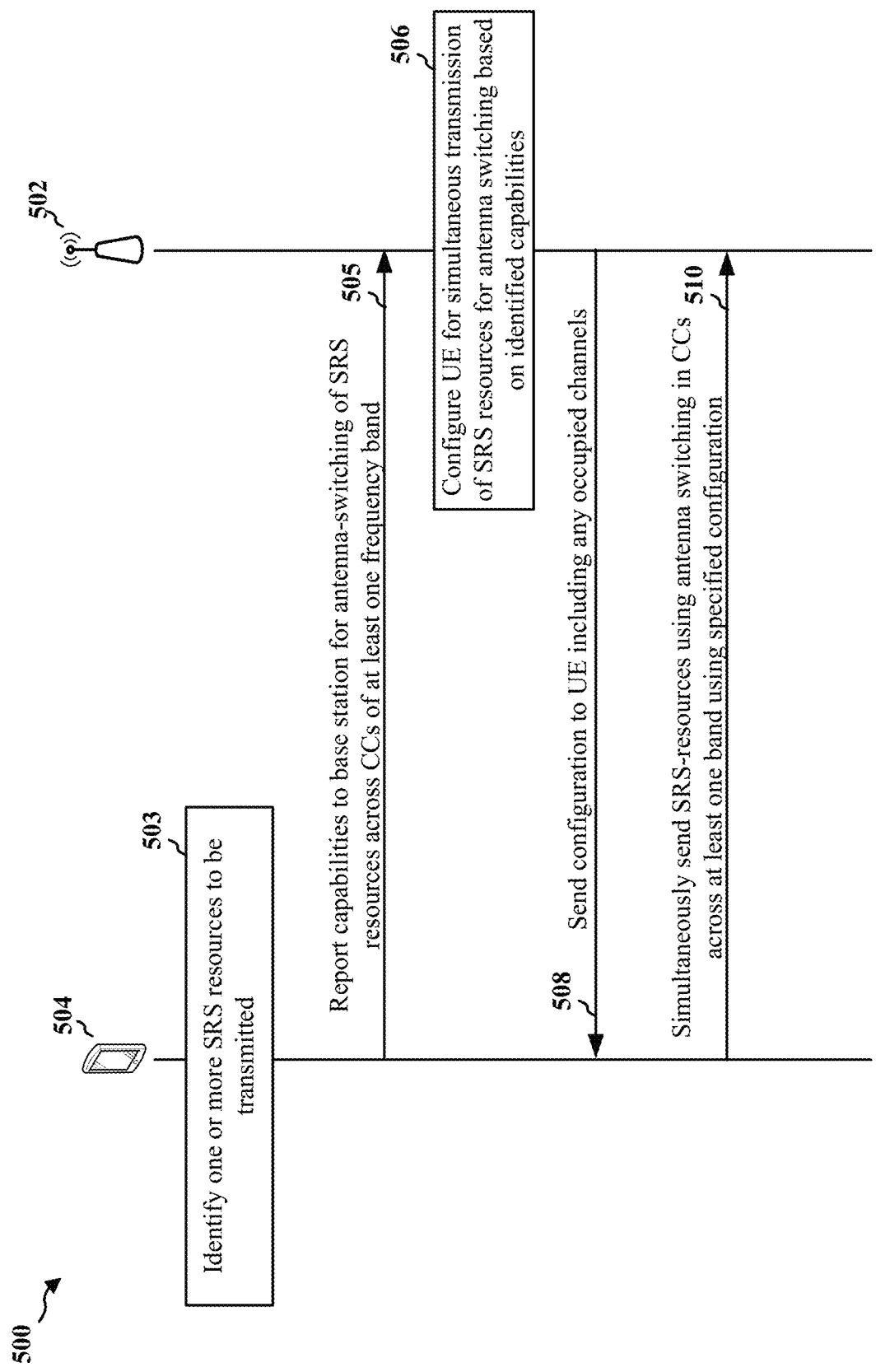
FIG. 5 is a timing diagram illustrating an exchange of wireless signals between a user equipment (UE) and a base station.

FIG. 5 is a timing diagram 500 illustrating an exchange of wireless signals between a user equipment (UE) and a base station. The steps of FIG. 5 may be carried out by the UE 104 and base station 102/180 of FIG. 1, for example, including the antenna/port mode SRS component 198 of UE 104 and the SRS configuration disclosure component 199 of base station 102/180. The steps may also be executed respectively by one or more of the controllers and/or processors shown in UE 350 or base station 310. The steps of the UE may also be carried out by one or more components of the apparatus 800 of FIG. 8. The steps of the base station may be carried out by one or more components of the apparatus 900 of FIG. 9.

The UE 504 may identify, in step 503, one or more SRS resources to be transmitted, for example using different CCs in carrier aggregation to a base station 502. Thereupon, the UE 504 may in step 505 send information reporting capabilities of the UE for purposes of antenna switching of SRS resources between different CCs of at least one frequency band. For example, the UE be reporting its capabilities to transmit information across the different CCs wherein the SRS resources overlap in the time domain from the perspective of the UE. In some configurations, the reported capabilities may include transmissions from the same UE antenna ports. The UE may also report an xTyR configuration of the UE, with x indicating the number of antenna ports and y indicating the number of antennas coupled to any one or more of the antenna ports. In some configurations, the number y of antennas may be the total number of antennas of the UE. In other configurations, the number y may be a subset of the total number of antennas of the UE, for example, that are capable of use in antenna switching between SRS resources across the at least one frequency band.

Having received the reported capabilities of the UE in step 505, the base station 502 may configure the UE to enable simultaneous transmission by the UE of SRS resources for antenna switching. According to one aspect of the disclosure, the configuration may be the same configuration as reported by the UE. At step 508, the base station may transmit to the UE 504 the configuration, which may include providing any occupied CCs that are currently unable to be used for antenna switching of SRS resources. In other implementations, additional or different information may be sent in the configuration. For example, the base station may identify the xTyR configuration along with the CCs for which the UE will simultaneously transmit across one or more bands. The SRS-based antenna switching may include intra-band or inter-band switching. In one configuration, the UE is not required to simultaneously transmit SRS resources on CCs of two or more bands that it did not report. This information may be implicit, or the base station 502 or UE 504 may make the information explicit in one or more communications.

Having received the configuration, the UE 504 may then begin simultaneously transmitting data including SRS resources using antenna switching between two or more CCs across at least one band using the specified configuration of antennas and antenna ports.

Figure 6:
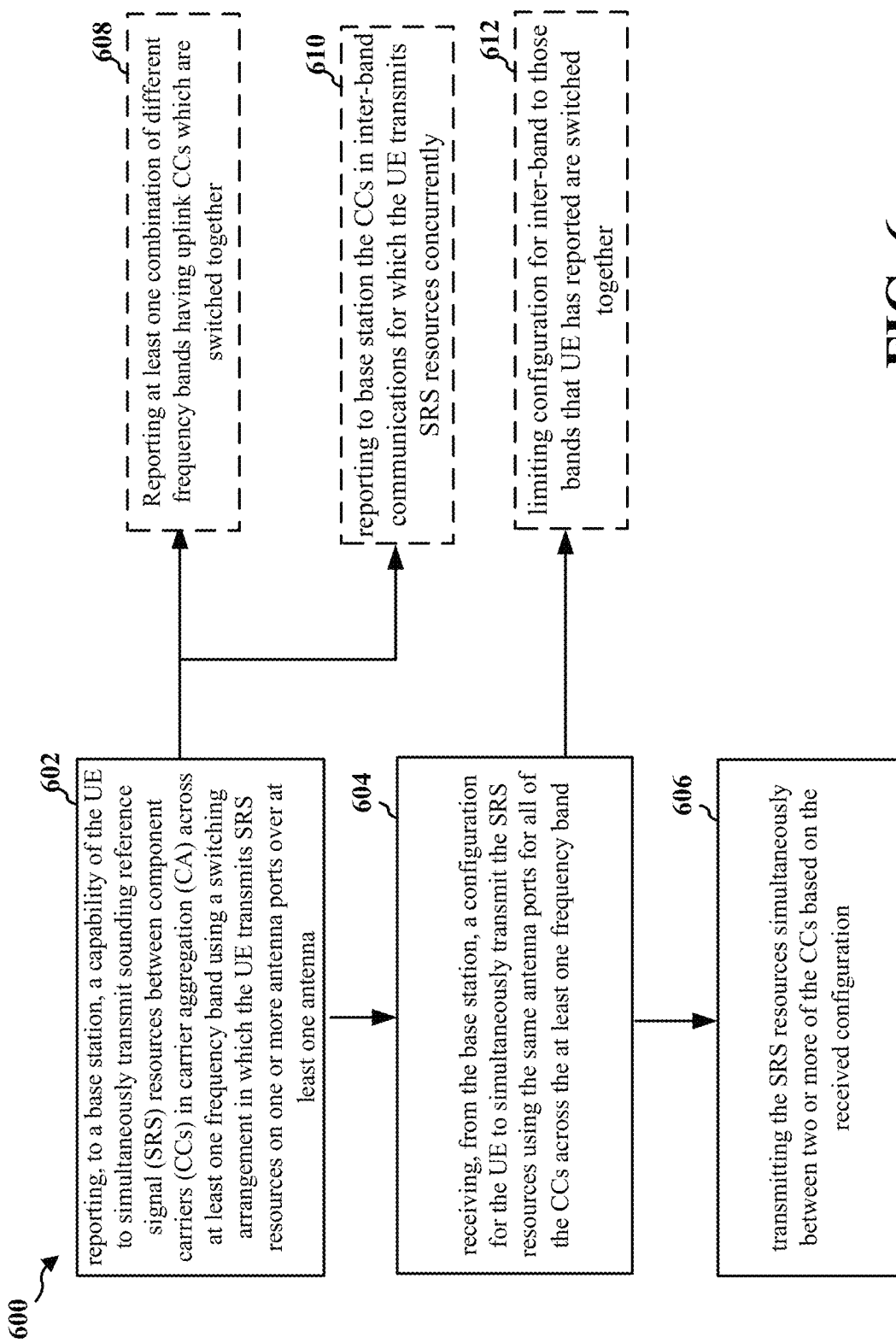
FIG. 6 is a diagram illustrating a flowchart of wireless communications.

FIG. 6 is a diagram illustrating a flowchart 600 of wireless communications. The steps of FIG. 6 may be carried out by the UE 104 and base station 102/180 of FIG. 1, for example, including the antenna/port mode SRS component 198 of UE 104 and the SRS configuration disclosure component 199 of base station 102/180. The steps may also be executed respectively by one or more of the controllers and/or processors shown in UE 350 or base station 310. The steps of the UE may also be carried out by one or more components of the apparatus 800 of FIG. 8. The steps of the base station may be carried out by one or more components of the apparatus 900 of FIG. 9. Boxes having dashed lines may represent optional steps.

At 602, the UE may report, to a base station, a capability of the UE to simultaneously transmit sounding reference signal (SRS) resources between component carriers (CCs) in carrier aggregation (CA) across at least one frequency band using a switching arrangement in which the UE transmits SRS resources on one or more antenna ports over at least one antenna. The specified arrangement of antenna ports and antennas may optionally be expressed in the form of the xTyR configuration as identified above. The reporting at 602 may take place during radio resource control (RRC) signaling, or at another time.

In some configurations, the UE may also report the identified CCs between which it is capable of switching or between which it expects to switch. The CCs may be located in a single frequency band for intra-band antenna-switching, or in a plurality of frequency bands for inter-band antenna-switching. In other configurations, such as in 610, the UE may report to the base station in the context of inter-band switching the CCs for which the UE transmits SRS resources using overlapped symbols from the UE's perspective.

At 604, the UE may thereafter receive, from the base station, a configuration for the UE to simultaneously transmit the SRS resources using the same antenna ports for all of the CCs across the at least one frequency band. In one configuration, the base station may partially or fully "mirror" the UE's reported capability by configuring the UE with simultaneous transmission of data across one or more CCs and across one or more frequency bands using the same configuration (e.g., xTyR) reported by the UE. In some examples involving inter-band communications with more than one band, the base station may explicitly limit the requirement of the UE to concurrently switch in bands for which the UE has not reported are switched together. As another example, the UE may limit the configuration of the UE to simultaneously transmit data to those CCs in which the UE has reported to the base station the capability to simultaneously transmit data using antenna switching. In other examples, this limitation may be implicit in the sense that the base station will only identify the antenna configuration (e.g., xTyR), and the UE will only transmit SRS resources in the CCs it previously identified.

At 606, the UE may transmit the SRS resources simultaneously between two or more of the CCs based on the received configuration. In some configurations, the simultaneous antenna switching may include data other than SRS resources. For example, some configurations may differentiate between antenna switching of SRS resources and antenna switching involving other data. Further, in some configurations, the SRS resources transmitted simultaneously in the time domain from the perspective of the UE are transmitted from the same UE antenna ports.

In addition to the advantages of flexibly allocating UEs with different capabilities the power accorded those particular UEs, the principles described herein benefit the network because the base station can determine in advance in which CCs of an uplink channel it can expect SRS resources from a particular UE. Optionally during configuration, the base station can specify the CCs that are occupied (or conversely, that are unoccupied), thereby enabling the network devices the ability to coordinate the transmission of SRS resources for a variety of purposes. Another advantage of this configuration is that the base station can configure the UE as a function of the UE's capabilities, meaning that the hardware of multi-antenna UEs can be taken into account during transmission of SRS resources and the network efficiency increased.

In additional aspects, the capability reporting features above include the UE reporting a capability, if applicable, of at least one combination of different frequency bands having uplink CCs which are switched together, as shown in step 608 such that the at least one frequency band includes the different frequency bands. In this configuration, the xTyR antenna switching arrangement may be the same for all the CCs included in the different frequency bands. In still other aspects, the at least one frequency band may include a plurality of frequency bands, such that the received configuration is identical for CCs included on different frequency bands of the plurality of frequency bands, and between which CCs the UE reports that the UE simultaneously transmits SRS resources.

Figure 7:
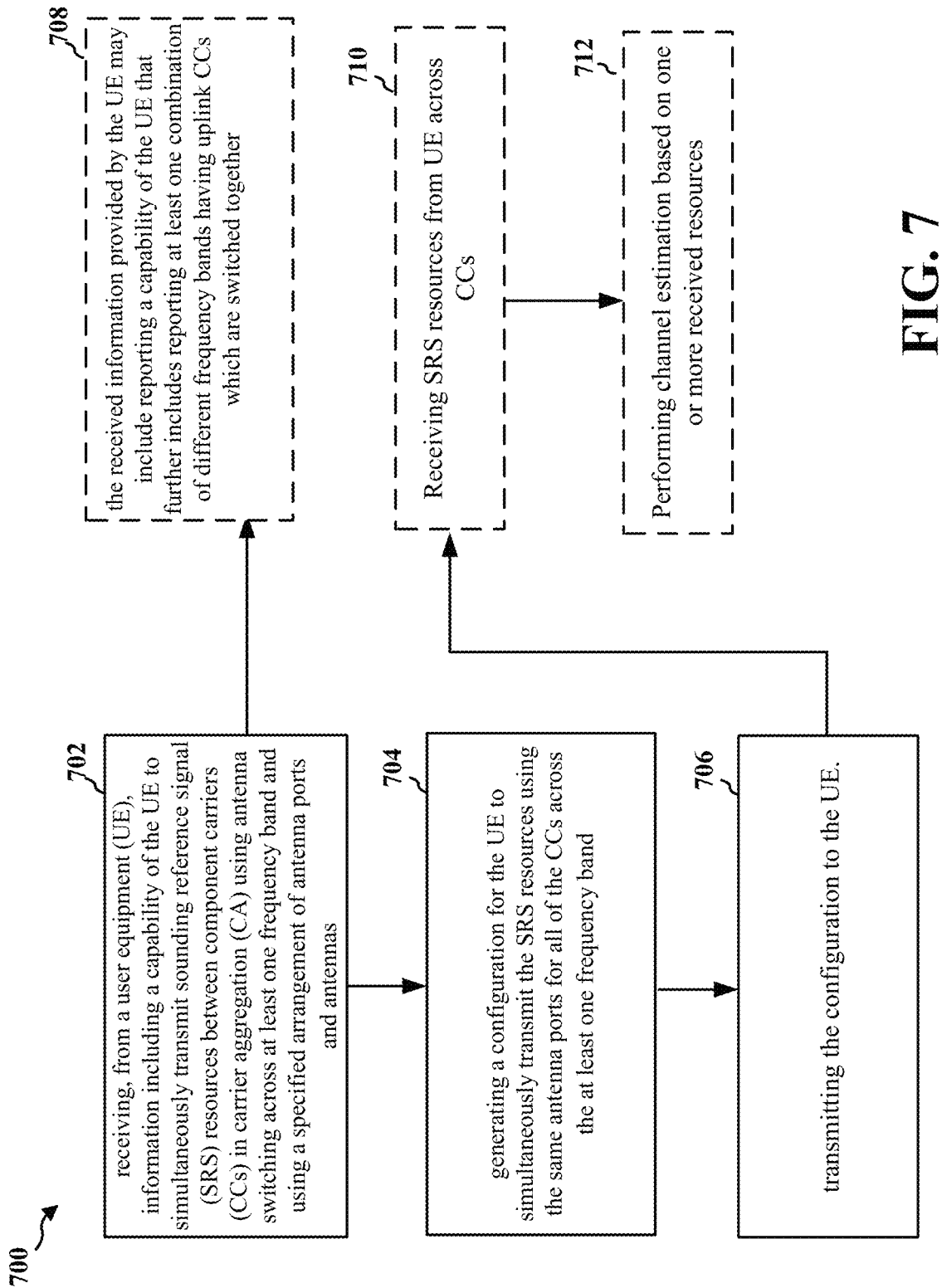
FIG. 7 is a diagram illustrating another flowchart of wireless communications.

FIG. 7 is a diagram illustrating another flowchart of wireless communications. The steps of FIG. 6 may be carried out by the UE 104 and base station 102/180 of FIG. 1, for example, including the antenna/port mode SRS component 198 of UE 104 and the SRS configuration disclosure component 199 of base station 102/180. The steps may also be executed respectively by one or more of the controllers and/or processors shown in UE 350 or base station 310. The steps of the UE may also be carried out by one or more components of the apparatus 800 of FIG. 8. The steps of the base station may be carried out by one or more components of the apparatus 900 of FIG. 9. Boxes having dashed lines may represent optional steps.

At 702, the base station may receive, from a user equipment (UE), information including a capability of the UE to simultaneously transmit sounding reference signal (SRS) resources between component carriers (CCs) across at least one frequency band using a switching arrangement in which the UE transmits SRS resources on one or more antenna ports over at least one antenna. Further, in some aspects, the UE may also identify the plurality of CCs that the UE expects will be used for sending SRS resources.

Upon receiving this information from the UE, the base station is made aware of the UE specific capabilities and xTyR configuration for antenna switching. Accordingly, at 704, the base station may generate a configuration for the UE to simultaneously transmit the SRS resources using the same antenna ports for all of the CCs across the at least one frequency band. In an aspect, the antenna switching configuration may be the same configuration (e.g., xTyR) provided by the UE. Of course, in the transmission from the UE (702) and the subsequent configuration of the UE by the base station 704, the x and y values are populated with the port configuration and the identity of those antennas (or subset thereof) that can be used for transmitting SRS resources or other data.

At 706, the base station may transmit the generated configuration to the UE. Equipped with the operating configuration, the UE may begin transmitting SRS resources as configured. In some aspects, such as in 710, the base station may receive SRS resources from the UE across the CCs identified by the CC. The transmitted SRS resources may be used for different purposes by the receiving base station, such as for performing channel estimation as shown in 712.

In additional configurations as described herein, the information provided by the UE may include reporting a capability of the UE that further includes reporting at least one combination of different frequency bands having uplink CCs which are switched together, such as shown in step 708. The at least one frequency band includes the different frequency bands in this case. Further, in one aspect, the xTyR antenna switching arrangement is the same for all the CCs included in the different frequency bands.

In another example, the at least one band comprises a plurality of frequency bands, and the received configuration is identical for CCs included on different frequency bands of the plurality of frequency bands and between which the UE reports that the UE simultaneously transmits SRS resources.

Figure 8:
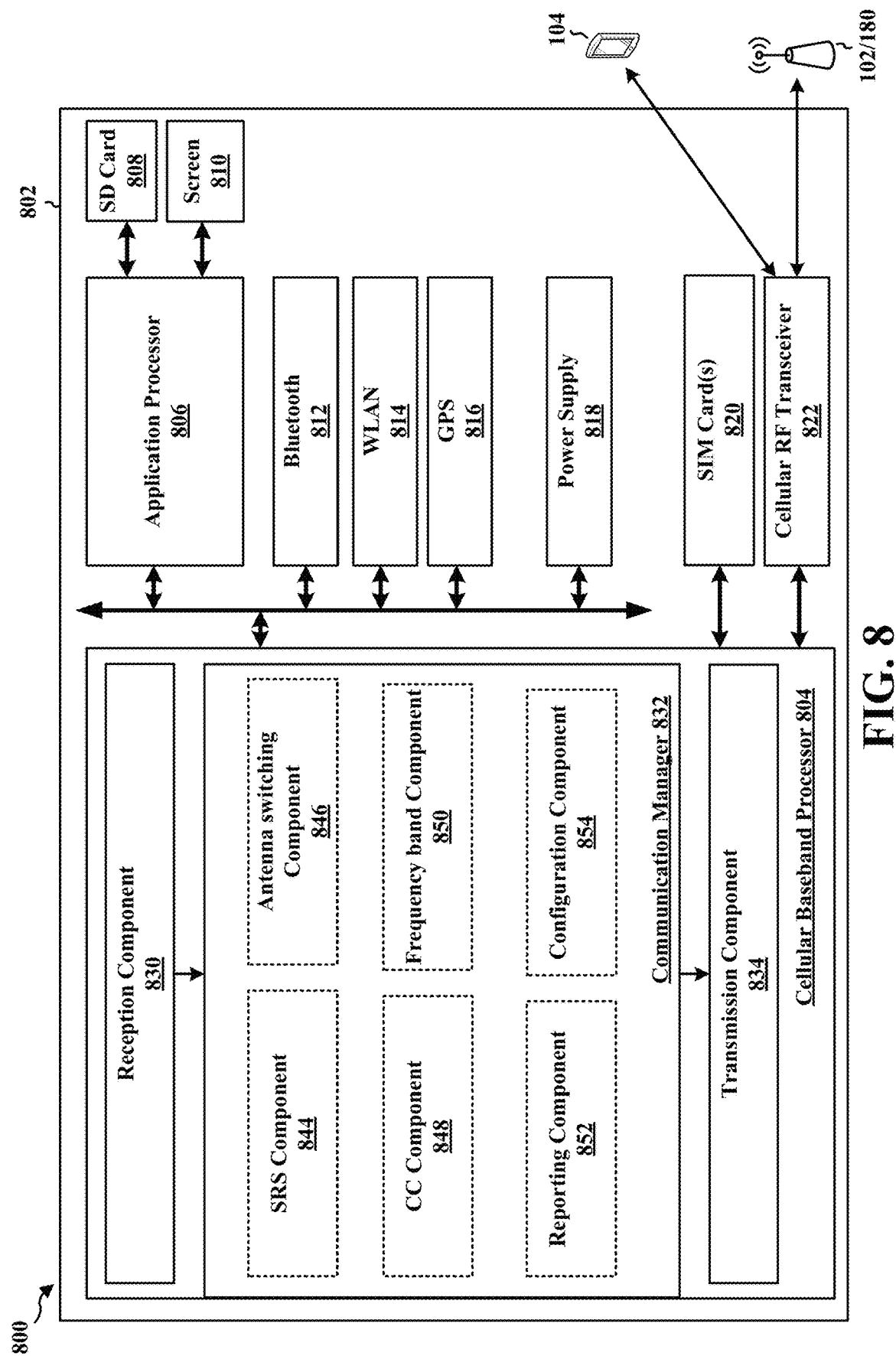
FIG. 8 is an apparatus at a user equipment in accordance with various aspects of the present disclosure.

FIG. 8 is an apparatus at a user equipment in accordance with various aspects of the present disclosure. FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 may include an SRS component 844 that is configured to manage the SRS resources of the UE 104 and to provide information to the base station, typically with other information, about its SRS resource sets and its capabilities for transmitting such SRS resources, e.g., as described in connection with blocks 422, 424, 426, 428, 432 and 434 of FIG. 4, and steps 503 and 505 of FIG. 5, The communication manager 832 may further include an antenna switching component 846 that receives input in the form of SRS resource information from the component 844 and is configured to identify an appropriate configuration for executing antenna switching based on the number of antennas and the number of ports. An exemplary antenna port may share more than one antenna and may include a power amplifier and individual filters and other circuits for conditioning the signal to be transmitted. Component 846 may assist in determining the set of circumstances under which antenna-switching can be performed to maximize performance. The communication manager 832 further includes a component 848 that receives input in the form of frequency band information 850 and input from the SRS component 844 and antenna switching component 846. In some implementations, these components can be assembled as a single component. In addition, these functions can be performed in software using the cellular baseband processor 804. The communication manager 832 further includes a related frequency band component 848 that receives input in the form of component carrier data from the CC component 848, the antenna switching component 846, and the SRS component 844. The frequency band component 850 may be configured to determine whether SRS resources should be transmitted on a single band using intra-band SRS, or across different bands using inter-band SRS, depending on factors like prior configurations or information received from the base station.

The communication manager 832 may further include reporting component 852, which may receive collective input from components 844, 846, 848, and 850. Based on the information from these components, reporting component 852 may be configured to use transmission component 834 to report, to a base station, a capability of the UE to simultaneously transmit sounding reference signal (SRS) resources between component carriers (CCs) in carrier aggregation (CA) across at least one frequency band using a specified arrangement of antenna ports and antennas, such as shown in step 505 of FIGS. 5 and 602 of FIG. 6. In an exemplary configuration, the UE may also identify to the base station the plurality of component carriers over which the UE expects to transmit, such as shown in step 608 of FIG. 6. The communication manager also may include configuration component 854, which may receive via the reception component 830 the configuration for the SRS simultaneous data transmission along with the antenna configuration Together with information from the configuration component, the antenna switching component may begin signaling the transmission component 834 of the processor 804 to transmit one or more SRS resources on designated CCs across the one or more frequency bands as shown in step 510 of FIG. 5 and step 606 of FIG. 6, for example.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for reporting, to a base station, a capability of the UE to simultaneously transmit sounding reference signal (SRS) resources between component carriers (CCs) in carrier aggregation (CA) across at least one frequency band using a specified arrangement of antenna ports and antennas; means for receiving, from the base station responsive to the reported capability, a configuration for the UE to simultaneously transmit the SRS resources using antenna switching for the CCs across the at least one frequency band using the specified arrangement of antenna ports and antennas; and means for transmitting the SRS resources simultaneously between at least two of the plurality of CCs in the at least one frequency band using the received configuration. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
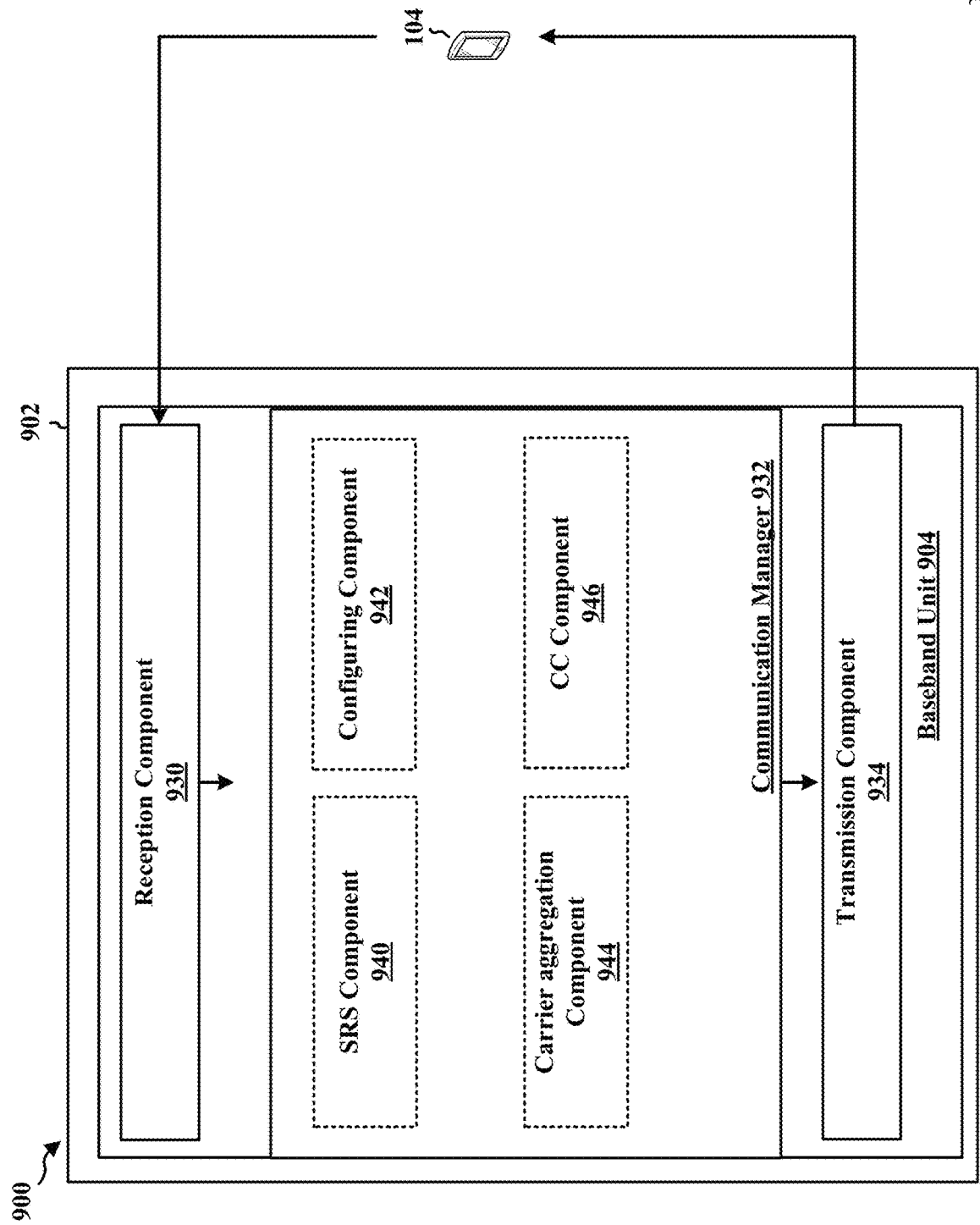
FIG. 9 is an apparatus at a base station in accordance with various aspects of the present disclosure.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes an SRS component 940 that may perform channel estimation measurements based on SRS transmissions from a U.E. e.g., as described in connection with step 510 of FIG. 5. The communication manager 932 further includes a component 944 that includes a carrier aggregation component that may identify different resources for use in connection with receipt of UE transmissions. Likewise, the communication manager 932 may also include a CC component 946 that works in conjunction with components 940 and 944 to identify different configurations for allocation to UEs, e.g., for transmitting SRS resources over multiple CCs. The communication manager 932 may further include a configuration component 942 that may receive, from a user equipment (UE), information including a capability of the UE to simultaneously transmit sounding reference signal (SRS) resources between component carriers (CCs) in carrier aggregation (CA) using antenna switching across at least one frequency band and using a specified arrangement of antenna ports and antennas, e.g., as described in connection with step 702 of FIG. 7. In some configurations, the UE identifies a plurality of CCs over which it expects to transmit SRS resources, which is received at CC component 946, as described in step 708 of FIG. 7. Each of components 940, 944 and 946 may receive relevant portions of the communication from the UE and may provide the configuring component 942 with information to generate a configuration for the UE's use in transmitting SRS resources across different CCs in one or more frequency bands.

Thereupon, component 942 may use the information to generate a configuration for the UE to simultaneously transmit the SRS resources using antenna switching for the CCs across the at least one frequency band including the specified arrangement of antenna ports and antennas, as described in connection with step 704 of FIG. 7. After generating the configuration, component 942 of the base station may provide the configuration to the transmission component 934 for transmitting the configuration to the UE, as described in connection with step 706 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a user equipment (UE), information including a capability of the UE to simultaneously transmit sounding reference signal (SRS) resources between component carriers (CCs) in carrier aggregation (CA) using antenna switching across at least one frequency band and using a specified arrangement of antenna ports and antennas; means for generating a configuration for the UE to simultaneously transmit the SRS resources using antenna switching for the CCs across the at least one frequency band including the specified arrangement of antenna ports and antennas, and means for transmitting the configuration to the UE. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
    reporting, to a base station, information indicating: (i) a capability of the UE to simultaneously transmit sounding reference signals (SRSs) via multiple component carriers (CCs) within a plurality of frequency bands using a switching arrangement in which the UE transmits the SRSs via one or more antenna ports of at least one antenna, and (ii) at least one combination of different frequency bands having uplink CCs which are switched together, wherein the plurality of frequency bands includes the different frequency bands;
    receiving, from the base station, a configuration for the UE to simultaneously transmit the SRSs using the same antenna ports for each CC of the uplink CCs within the different frequency bands, wherein the received configuration includes an xTyR switching arrangement that is the same for each CC of the uplink CCs reported to the base station; and
    transmitting the SRSs simultaneously via two or more CCs of the uplink CCs based on the received configuration.

2. The method of claim 1, wherein:
    xTyR corresponds to the UE transmitting SRS resources via a number x of antenna ports over a total number y of antennas, and
    y corresponds to all or a subset of receive antennas of the UE.

3. The method of claim 1, wherein the received configuration further includes an identification of occupied CCs within the plurality of frequency bands.

4. The method of claim 2, wherein the received configuration is different for frequency bands having respective CCs via which the UE does not simultaneously transmit SRSs.

5. An apparatus for wireless communication at a user equipment (UE), comprising;
    a memory:
    at least one processor coupled to the memory and configured to:
        report, to a base station, information indicating: (i) a capability of the UE to simultaneously transmit sounding reference signals (SRSs) via multiple component carriers (CCs) within a frequency band using a switching arrangement in which the UE transmits the SRSs via one or more antenna ports of at least one antenna, and (ii) at least one combination of uplink CCs within the frequency band which are switched together;
        receive, from the base station, a configuration for the UE to simultaneously transmit the SRSs using the same antenna ports for each CC of the at least one combination of uplink CCs within the frequency band, wherein the received configuration includes an xTyR switching arrangement that is the same for each CC of the at least one combination of uplink CCs reported to the base station; and
        transmit the SRSs simultaneously via two or more CCs of the at least one combination of uplink CCs based on the received configuration.

6. The apparatus of claim 5, wherein xTyR corresponds to the UE transmitting SRS resources via a number x of antenna ports over a total number y of antennas, wherein y corresponds to all or a subset of receive antennas of the UE.

7. The apparatus of claim 5, wherein the received configuration further includes an identification of occupied CCs within the frequency band.

8. A method for wireless communication at a base station, comprising:
    receiving, from a user equipment (UE), information indicating: (i) a capability of the UE to simultaneously transmit sounding reference signals (SRSs) via multiple component carriers (CCs) within a frequency band using a switching arrangement in which the UE transmits the SRSs via one or more antenna ports of at least one antenna, and (ii) at least one combination of uplink CCs within the frequency band which are switched together;

generating a configuration for the UE to simultaneously transmit the SRSs using the same antenna ports for each CC of the at least one combination of uplink CCs within the frequency band, wherein the configuration includes an xTyR switching arrangement that is the same for each CC of the at least one combination of uplink CCs; and transmitting the configuration to the UE.

9. The method of claim 8, wherein xTyR corresponds to the UE transmitting SRS resources via a number x of antenna ports over a total number y of antennas, and wherein y corresponds to all or a subset of receive antennas of the UE.

10. The method of claim 8, wherein the transmitted configuration further includes an identification of occupied CCs within the frequency band.

11. The method of claim 8, wherein the transmitted configuration is different for frequency bands having respective CCs via which the UE does not simultaneously transmit SRSs.

12. An apparatus for wireless communication at a base station, comprising:

memory; and at least one processor coupled to the memory and configured to:

receive, from a user equipment (UE), information indicating: (i) a capability of the UE to simultaneously transmit sounding reference signals (SRSs) via multiple component carriers (CCs) within a plurality of frequency bands using a switching arrangement in which the UE transmits the SRSs via one or more antenna ports of at least one antenna, and (ii) at least one combination of different frequency bands having uplink CCs which are switched together, wherein the plurality of frequency bands includes the different frequency bands;

generate a configuration for the UE to simultaneously transmit the SRSs using the same antenna ports for each CC of the uplink CCs within the different frequency bands, wherein the configuration includes an xTyR switching arrangement that is the same for each CC of the uplink CCs; and transmit the configuration to the UE.

13. The apparatus of claim 12, wherein:

xTyR corresponds to the UE transmitting SRS resources via a number x of antenna ports over a total number y of antennas, and y corresponds to all or a subset of receive antennas of the UE.

14. The apparatus of claim 12, wherein the transmitted configuration further includes an identification of occupied CCs within the plurality of frequency bands.

* * * * *